Oct. 20, 1970     W. SAUER     3,535,034
SLIDE PROJECTORS
Filed June 10, 1968     3 Sheets-Sheet 1
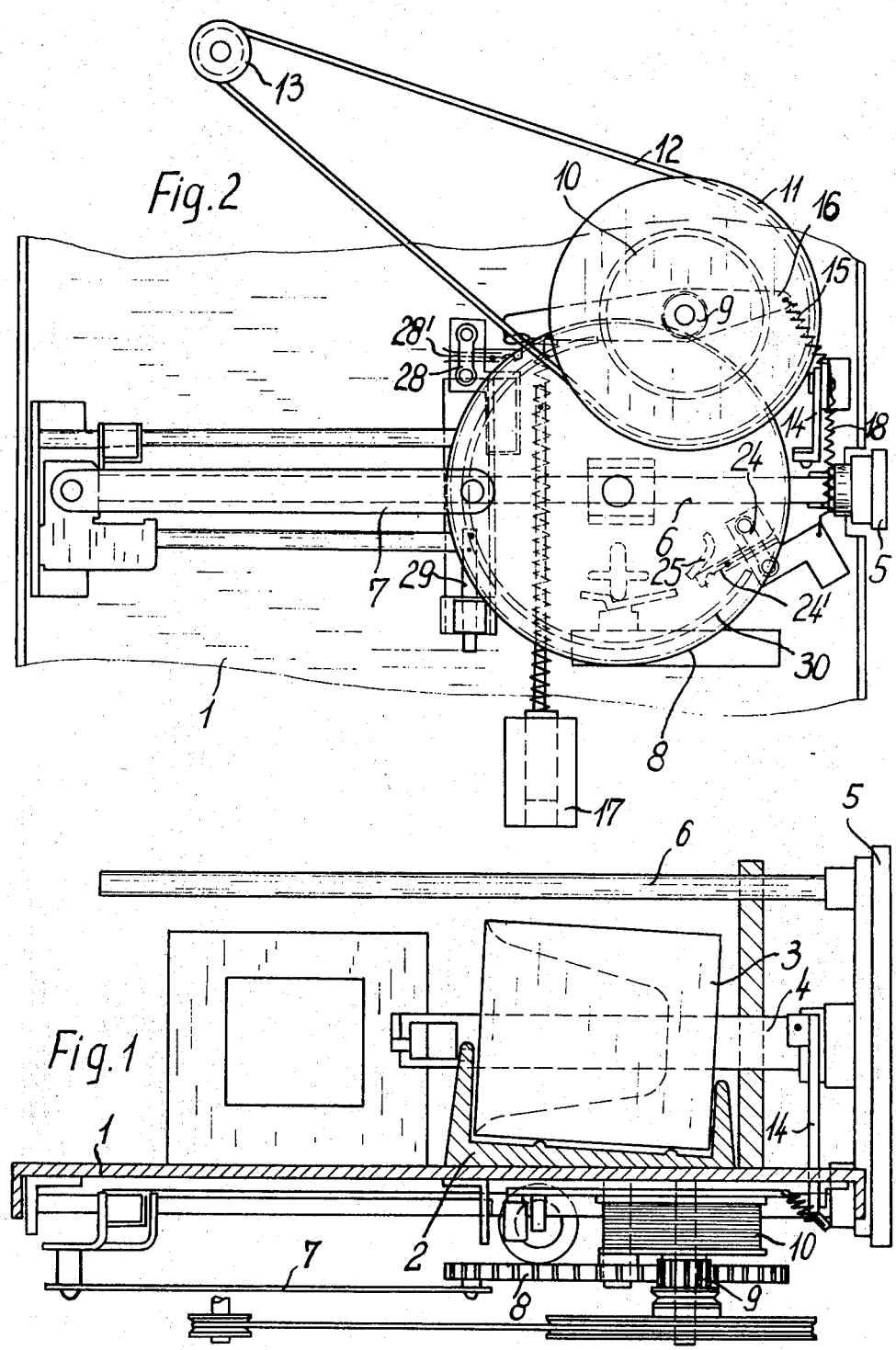

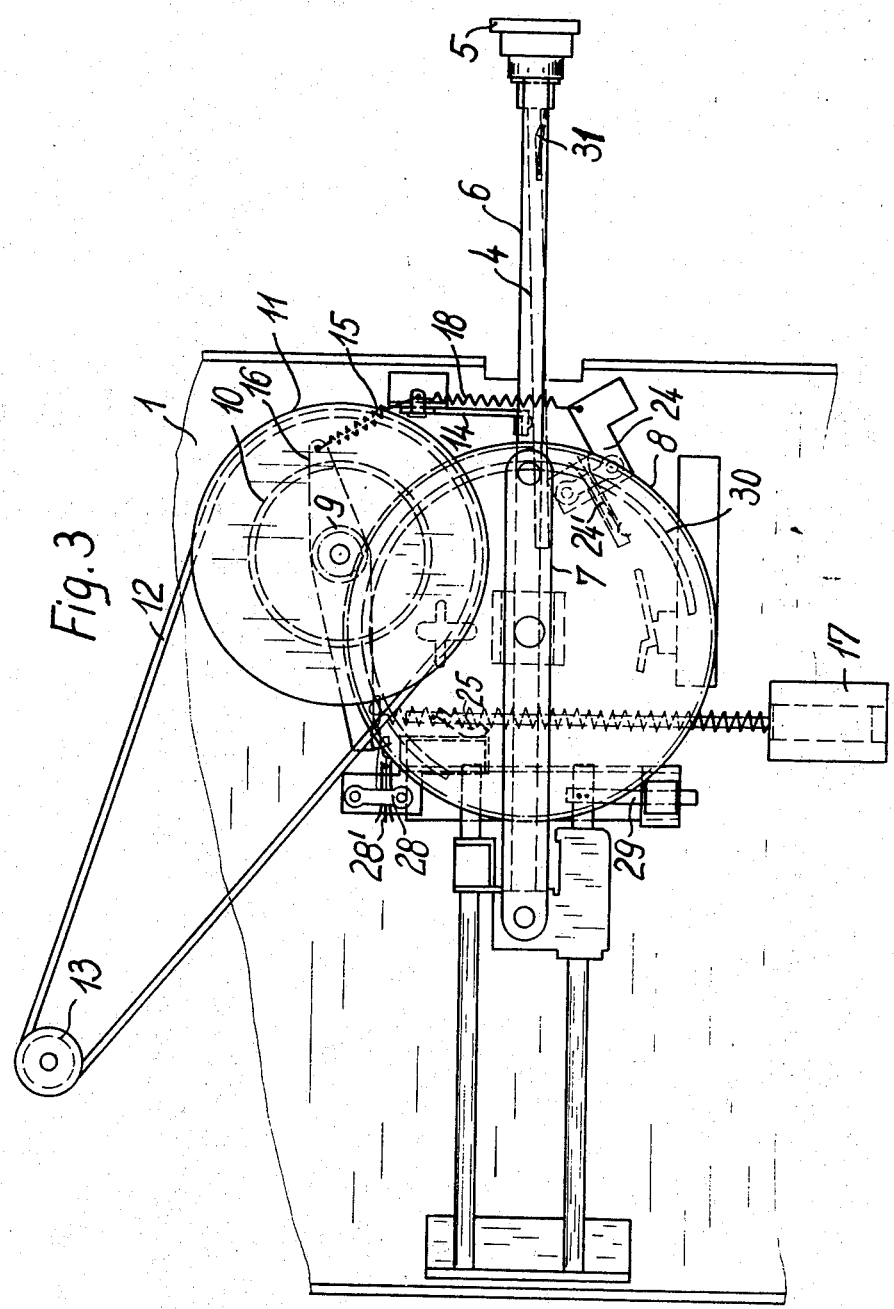

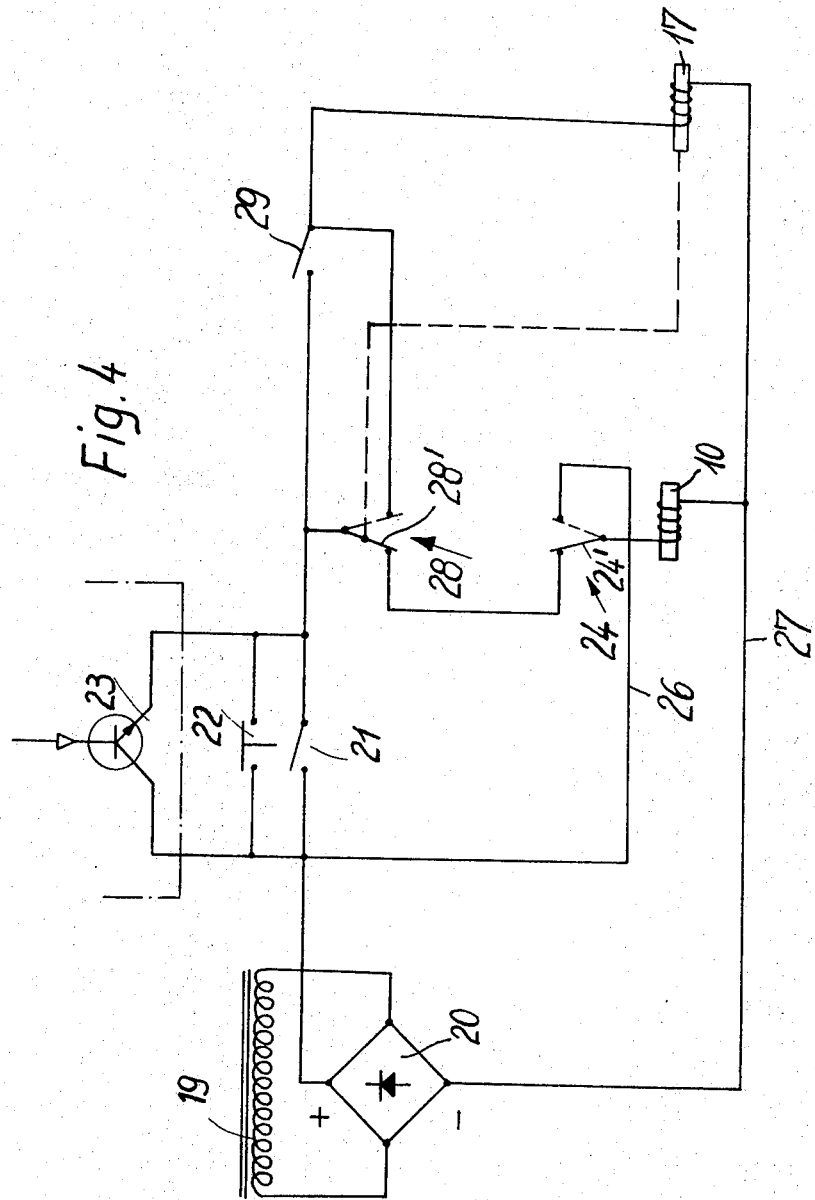

United States Patent Office 3,535,034
Patented Oct. 20, 1970

3,535,034
SLIDE PROJECTORS
Werner Sauer, Nuremberg, Germany, assignor to Carl Braun Camerawerk, Nuremberg, Germany, a firm
Filed June 10, 1968, Ser. No. 735,619
Claims priority, application Germany, June 24, 1967, B 93,172
Int. Cl. G03b 23/02
U.S. Cl. 353—106                                        1 Claim

ABSTRACT OF THE DISCLOSURE

A slide projector with switch means for preventing operation of a slide transport mechanism more than once by excessively long operation of a control switch. A first switch closes the circuit to a magnetic clutch which initiates a slide changing cycle. During the cycle a second switch is automatically closed to maintain the current supply to the clutch and a third switch is automatically closed to energize an electromagnet. The electromagnet operates to advance the slide magazine and to operate a fourth switch which closes a circuit to (1) maintain the current supply to the electromagnet and (2) to open the circuit to the clutch in order to prevent recycling of the slide changing mechanism until the first switch is released and reclosed.

---

The present invention relates to slide projectors. More particularly it relates to slide projectors of the type comprising a magnetic clutch and a reciprocating slide moving means or plunger driven by a crank mechanism. In such a slide projector the plunger is arranged to assume an oblique position in relation to the longitudinal axis of the magazine so that on passing into the magazine for the transport of a slide into the optical system it moves the magazine along its axis to the front or to the rear, the oblique positioning of the plunger being brought about by an actuating magnet working against the action of a return means such as a spring. When a control switch is actuated the magnetic clutch is operated and this clutch is held in an energized condition by a further switch actuated by the crank mechanism, once the latter has started to rotate, so that the control switch can be released without the magnetic clutch being de-energized. As a result the magnetic clutch is energized and then de-energized after substantially one revolution of the crank mechanism so that the time which the control switch is operated is not critical for the performance of the slide transport cycle. In such projectors spring loaded pairs of contacts or the like are arranged to energize the actuating magnet for causing the oblique setting of the plunger before crank mechanism has reached its outer dead centre position and is arranged to de-energize the actuating magnet when the dead centre position has been passed. This spring contact means can be operated by the crank mechanism, in the form of a wheel carrying a crank pin, or by the plunger.

A disadvantage of such projectors is that the person using them may operate the control switch so long that the plunger performs two slide transport cycles in succession, that is to say brings about the insertion of the required slide into the optical system for projecting it, but owing to an operation of the control switch lasting too long, causes the desired slide to be removed again and replaced by the next slide in the magazine.

One object of the invention is to avoid this disadvantage of prior art slide projectors.

A further object of the invention is the provision of a projector comprising a switch which can be mechanically moved between two positions by the actuating magnet, the switch in one position being connected with the switching part in series or in the other position it is connected parallel to the spring contact. A switch thus forms a separating or interrupting means in the circuit of the magnetic clutch, which during the operation of the actuating magnet is open and prevent unintended actuation of the magnetic clutch even if the control switch is actuated by the user for an excessively long time, with the result, that renewed operation of the magnetic clutch requires a repeated operation of the control switch.

These objects and features of the invention will be made clear in the following description of a preferred embodiment of the invention, referring to the attached drawings.

FIG. 1 is a partial section of a slide projector.

FIG. 2 is a view from below of a slide projector with the slide plunger in the inner terminal position.

FIG. 3 shows a slide projector with the plunger in the outer terminal position.

FIG. 4 is a circuit diagram of the electrical equipment of a slide projector in accordance with the invention.

Referring now to the figures and more particularly to FIGS. 1 and 2, reference numeral 1 denotes the frame of the projector while reference numeral 2 denotes a magazine guide means in which the guide magazine 3 is received so that it can slide in the direction of its length, that is to say in a plane perpendicular to the plane of FIG. 1. A slide engaging means 4, which because of its plunging action is referred to in what follows as a plunger, is arranged to pass in a transverse direction through the slide magazine 2 for the removal of slides from it and their insertion into the optical system. The position of the plunger 4 and a slide corresponding to projection of the slide is shown in FIG. 1; the optical system is omitted from the drawings as it can be of the well-known type. The plunger 4 is mounted on a plunger carrier 5 so it can swivel to some extent in a horizontal plane. The plunger carrier 5 is mounted, in turn, on a guide rod 6 for movement in a direction transverse in relation to the magazine. The plunger carrier 5 is moved by means of a pitman 7 and a crank means in the form of a crank wheel 8 with the crank pin. The plunger carrier therefore moves between an inner position as shown in FIGS. 1 and 2 and an outer position as shown in FIG. 3. The crank wheel 8 is driven by a pinion 9 which in turn is driven via a magnetic coupling or clutch 10. The latter is driven by a drive wheel 11, when energized, and the drive wheel is in turn driven by a belt 12 and a small pulley 13. The belt 12 is always in engagement with the two pulley wheels. The plunger 5 is arranged to be moved into an oblique position as it is moved into the slide magazine by cooperating with housing walls so that an advancing movement is exerted on the magazine. It will be understood that these movements in accordance with the inclination of the plunger in one direction or the other in relation to the central plane of the plunger brings about forward movements of the magazine. Alternatively the magazine can be arranged to be fed in a backward direction. The swiveling movements of the plunger are brought about by a lever 14 which is connected by means of a tension spring 15 with a double armed lever 16 which is arranged to be swiveled by the actuating magnet 17. The lever 14 is spring-loaded by means of a return spring 18. If the lever 14 does not act upon the plunger a spring 31 causes the plunger to return automatically.

The manner of operation of the slide projector in accordance with the invention will now be described with more particular reference to FIG. 4. In this figure 19 and 20 denote a transformer and rectifier respectively serving as a power pack. The rectifier 20 supplies the magnetic clutch 10 and the actuating magnet 17. The power pack can also serve for the drive motor (not shown) and the lamp of the projector. For operating the magnetic clutch 10 or the actuating magnet 17 use can be made of a press switch 22 to be operated by the user, a radio-controlled switch mechanism whose final stage is indicated by 23, or by a time switch 21. All the switch means are generally referred to as first switch means. In circuit with the magnetic clutch 10 there is a microswitch 24, referred to in what follows as the second switch, which before each slide changing circle, that is to say movement of the plunger from the position shown in FIG. 1 to that shown in FIG. 2 and back again, assumes the position shown in FIG. 4 in full-lines but is moved out of this position into the position shown in broken lines owing to the action of control cam 25 is mounted on the crank wheel 8, on the crank wheel being moved out of the position shown in FIG. 2 into that shown in FIG. 3. In this latter position the magnetic clutch 10 is connected by leads 26 and 27 directly with the rectifier 20. The second switch 24 remains in the position shown in broken lines even after the first switch has been opened. After the crank wheel 8 has turned further the switch 24 swings back into the position shown in whole lines in FIG. 4 so that owing to the de-energization of the magnetic clutch 10 the drive of the slide transport plunger 4 is interrupted in the inner terminal position. In accordance with the invention the actuating magnet 17 is connected mechanically via the double-armed lever 16 with a third switch 28 which in the position shown in full lines in FIG. 4 is connected in series with the second switch 24 and in its other position shown in broken lines is connected in parallel with the fourth switch 29 or spring contact, in the circuit of the actuating magnet 17.

If the user's switch, that is to say the first switch is actuated for a long period of time the magnetic clutch 10 first connects the drive motor with the crank wheel 8 and after a rotation of the latter of about 160°, the spring contact constituting the fourth switch is moved mechanically by the projection 30 of the crank wheel 8, so that the actuating magnet 17 causes a swiveling of the plunger for feed movement of the slide magazine. Simultaneously the actuating magnet 17 moves the moving part 28' of the switch 28 into the position shown in broken lines (FIG. 4) so that even after the fourth switch 29 has been opened owing to the crank wheel 8 passing beyond the position corresponding to the extreme outward position of the plunger, and the circuit of the actuating magnet remains closed owing to the switch 28 until first switch means is opened again. If the first switch is opened before the plunger has reached its inner terminal position, the actuating magnet 17 is de-energized and returns to its original position and the moving part 28' is returned to the position shown in whole lines in FIG. 4. For a further slide change renewed operation of the first switch, that is to say one of the switch elements 21, 22, or 23, is necessary. If the first switch means is operated by the user for an excessive time, that is to say longer than the time taken by a slide changing cycle, no further slide changing cycle is performed because in the meantime the moving part 24' of the switch will have been moved back in the position shown in whole lines (see also FIG. 2) as the plunger 4 moves into its inner terminal position. As a result it follows that intended movements of the plunger 4, irrespective of how long the first switch is held closed by the user, are prevented.

I claim:

1. In a slide projector comprising a frame, a sliding slide magazine for carrying slides in parallel array, a reciprocating slide feed plunger arranged to move slides one at a time out of the magazine into a projecting optical system for projection, the plunger being arranged to perform an outward and return stroke making up a working cycle, an actuating electromagnet for swiveling the plunger during the course of a working cycle for the purpose of advancing the magazine along its direction of travel, a return spring for restoring the angular position of the plunger after deflection by the electromagnet, a rotary crank pin and a crank rod for reciprocating the plunger, a magnetic clutch for operation of the crank pin, a first switch for supplying current to the magnetic clutch, a second switch arranged to be closed once a working cycle of the plunger has been initiated to keep the clutch supplied with current irrespective of the setting of the first switch, the second switch being opened by the time the cycle is completed, and a third switch arranged to operate the electromagnet after the start of a plunger cycle, the improvement which consists in that the projector further comprises a fourth switch which is arranged to be operated mechanically by the electromagnet and to place the magnet in series with the first switch for operation of the electromagnet as long as the first switch is closed and to disconnect the first switch from the clutch.

References Cited

UNITED STATES PATENTS 3,192,657   7/1965   Mulch _____ 353—106

SAMUEL S. MATTHEWS, Primary Examiner